Figure 1:
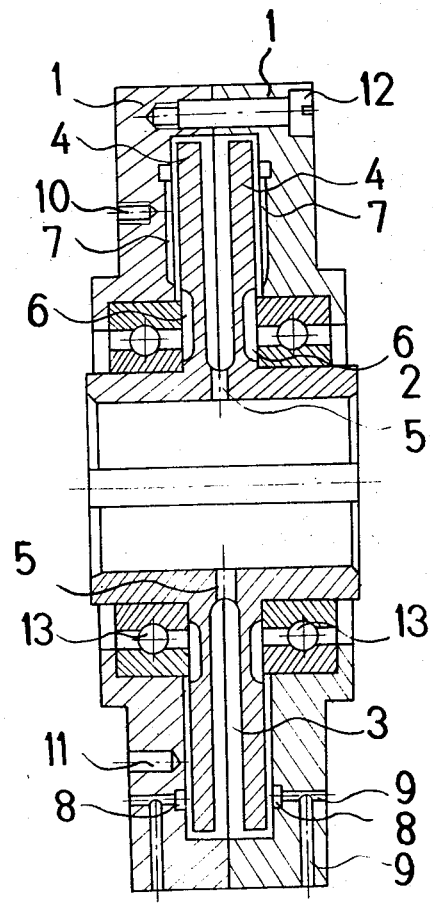

United States Patent

Zautaszwili

[15] 3,651,909
[45] Mar. 28, 1972

[54] FRICTION DISC CLUTCH OR BRAKE

[72] Inventor: Irakli Zautaszwili, Poznan, Poland

[73] Assignee: Zaklady Prezemyslu Metalowego H. Cegielski, Posnan, Poland

[22] Filed: Oct. 16, 1969

[21] Appl. No.: 867,039

[30] Foreign Application Priority Data

Oct. 19, 1968 Poland..................................P.129633

[52] U.S. Cl......................192/88 A, 192/113 B, 192/106 F, 188/366
[51] Int. Cl.......................................................F16d 25/04
[58] Field of Search..............192/88 A, 85 AB, 113 B, 106 F; 188/152, 86 A, 264.22, 264.25

[56] References Cited

UNITED STATES PATENTS

| Re. 24,905 | 12/1960 | Giffen | 192/88 A X |
| 2,621,769 | 12/1952 | Cardwell et al. | 192/88 A |
| 3,407,912 | 10/1968 | Moore | 192/88 A |

FOREIGN PATENTS OR APPLICATIONS

| 372,825 | 4/1907 | France | 192/88 A |
| 1,112,416 | 11/1955 | France | 192/85 A |
| 1,222,083 | 4/1960 | France | 188/152.86 A |

*Primary Examiner*—Benjamin W. Wyche
*Attorney*—Irvin A. Lavine

[57] ABSTRACT

A friction disc clutch or brake has axially spaced friction discs within a hollow body, the space between the discs providing a pressure chamber to which are connected fluid inlet and outlet passages: the outlet passages have a greater resistance to flow than the inlet passages. Specifically, the outlet passage includes an annular space between the outer periphery of each of the discs and the adjacent interior wall of the hollow body. In a modification, there is not outflow, but only an inlet passage.

2 Claims, 2 Drawing Figures

FRICTION DISC CLUTCH OR BRAKE

The invention relates to a friction disc clutch which can be engaged hydraulically or pneumatically designed for general use, specifically in machine tool drives, and can also be applied as a brake.

There are known friction disc or multiple plate clutches, which can be engaged hydraulically or pneumatically, in which the fluid operates under pressure and the release of the disc or plates, after terminating the pressure is effected by means of springs.

The springs are used in other cases for transmission of torque, and the fluid is employed for releasing.

Despite the contact design and high velocity of operation of clutches of this type, being less than 0.1 second and, thus, of the order of the operational velocity of electromagnetic clutches, they show many drawbacks. The most important drawback is a complex design of the clutch, which consists of a great number of parts and large overall dimensions.

Moreover, this type of clutch is characterized by a high power consumption during idling, generation of a high amount of heat, limited operation possibility in a vertical system, which results in overall low efficiency and dependability.

The purpose of the present invention is the construction of a clutch or brake, of simple design, with small number of parts and small overall dimensions, with high operation reliability in both vertical and horizontal positions, with small power consumption during idling and high general efficiency.

This purpose has been achieved through the construction in which inside a hollow body, a hub with axially spaced resilient discs is mounted for rotation, whereby the cross sections of annular slots, formed due to the difference of diameters between the interior of the body and the resilient discs, is so chosen that the resistance to the fluid flowing through these sections is greater than the resistance to the fluid flowing through the total section of fluid supply holes, provided in the hub leading to a pressure chamber between the discs.

In a case where this requirement has not been accomplished due to the uniform pressure of the fluid, the above described clutch would operate not as a friction but as a hydraulic one, with very low capacity of transmitting torque.

The fluid being fed fills the chamber between the resilient discs as well as the spaces between the resilient discs and the body.

The essence of the invention in another embodiment of the clutch, on the other hand, consists in that inside the hollow body a hub with resilient discs is journalled, and the chamber between the resilient discs is sealed by means of a ring.

The present invention apparatus enables a high frequency of engagements in a short time, whereby the clamping of the clutch-brake can be effected from outside or at one side of the body of the driven unit.

The further advantage of the solution is a possibility of obtaining a better ratio of dynamic to static moment, by obtaining a greater dynamic moment and the possibility of using a periodic outflow of fluid, for instance, for lubrication of gears.

Since the ball bearings of the clutch have some initial axial tension, the rigidity of the whole clutch is increased. The power consumption during idling and the amount of heat generated are the least possible, since there occur only resistances of the revolving bearings of the clutch, due to which a high general efficiency has been obtained.

At the moment of the engagement of the clutch-brake a partial slip of the disc against the body occurs, owing to which the engagement is elastic and, consequently, some amount of heat is produced.

The heat is abstracted by the fluid that flows out from the clutch.

Figure 2:
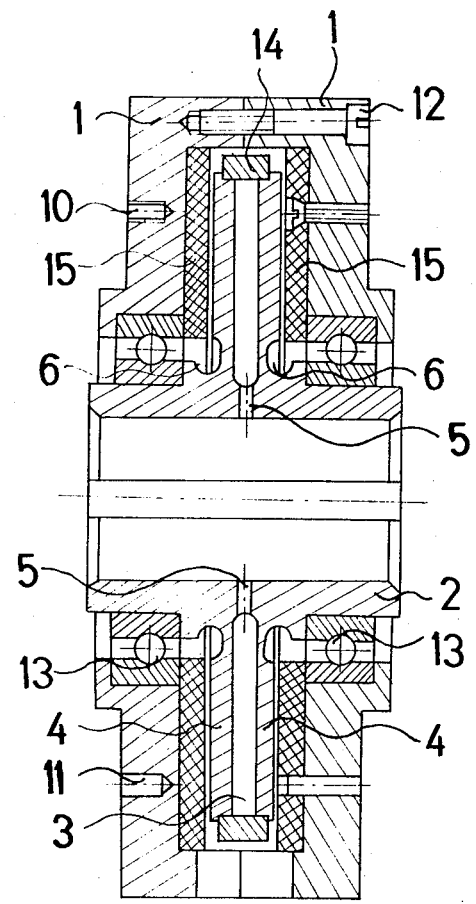

The subject of the invention is illustrated by way of examples in the drawing, in which FIG. 1 shows an axial section of the clutch-brake, and FIG. 2 shows a modification axial section.

The clutch according to the present invention has a two part body 1 inside which is journalled hub 2 from which extend two flat resilient discs 4 which are axially spaced so that between them a chamber 3 is formed.

The hub 2 has holes 5 connecting the inside of the hub 2 with a chamber 3 through which fluid is fed. The flat discs 4 are provided with undercuts 6 which add to their resilience.

In the contact surfaces within body 1 are radial slots 7 connected with peripheral slots 8 which in their turn are joined with holes 9. For clamping the clutch the threaded holes 10 and set holes 11 are used, while for connecting the parts of the body 1 the screws 12 are employed. The body 1 is mounted on hub 2 on roller bearings 13.

In FIG. 1 is shown, by way of example, the clutch and its elements in idle position. The hub 2 together with flat resilient discs 4 mounted on the shaft (not shown) is revolving, thus being a driving unit, while the body 1 is an element of the driven unit.

The engagement of the clutch is effected through supply of fluid under pressure to chamber 3 through holes 5 and holes in the hollow shaft. Since the annular passage between the interior wall of body 1 and the periphery of the resilient discs 4 is very small, the fluid penetrates in minimum quantity between the inner side contact surfaces of body 1 and resilient discs 4, and the increase of pressure in the space of chamber 3 causes flexing of resilient discs 4.

At this time the fluid present between resilient discs 4 and body 1 is scraped into radial slots 7, from where it flows out through peripheral slots 8 and holes 9.

The engagement of the clutch follows at the moment, when between body 1 and resilient discs 4 sufficient friction for engagement and torque transmission is produced.

From the moment of connection, during the operation of the clutch, the outflow of fluid outside the clutch is cut off, due to side sealing, resulting from engagement of the resilient discs 4 with the contact surfaces of body 1 outwardly of the radial slots 7.

The disengagement of the clutch is effected by interruption of the inflow of fluid under pressure. The return of resilient discs 4 to their primary position is effected under the influence of the force of elasticity of resilient discs 4.

In order to keep the deformations of resilient discs 4 within the limits of material elasticity and to avoid a decrease in the force of pressure of resilient discs 4 to the body 1, a relatively small side play between body 1 and resilient discs 4 should be given.

Another embodiment of a clutch in accordance with the present invention is shown by way of example in FIG. 2. In this example the sealing element is the ring 14 mounted on resilient discs 4.

The ring 14 revolves together with resilient discs 4. To increase the torque transmitted by the clutch and to cut the engagement time, it is useful to apply friction linings 15.

It is evident that the invention is not limited to the specific embodiments discussed above, in which various modifications in the shape, design, and particular elements can be introduced, however, within the limits of patent claims.

What is claimed is:

1. A friction disc clutch or brake comprising:
 a hollow body,
 surface means within said body defining a contact surface,
 surface means engaging means within said body movable between positions engaging and spaced from said surface means,
 fluid pressure chamber means within said body in operative relationship to said engaging means,
 fluid inlet means and fluid outlet means communicating with said chamber means,
 said fluid outlet means having a greater resistance to fluid flow than said fluid inlet means,
 means for sealing off said fluid outlet means upon an increase of pressure in said fluid pressure chamber means,
 said surface means engaging means comprising at least one resilient disc, a surface of said disc defining at least a portion of said fluid pressure chamber means, said surface means having radial slots therein, a peripheral slot in communication with said radial slots, and an outlet passage in communication with said peripheral slot.

2. The structure of claim 1, wherein said means for sealing off said fluid outlet means comprises a portion of said surface means outwardly of said radial slots, and a portion of said resilient disc.

* * * * *